(12) United States Patent
Beppu et al.

(10) Patent No.: US 6,811,602 B2
(45) Date of Patent: Nov. 2, 2004

(54) PROCESS FOR PREPARING SILICATE POROUS PRODUCT

(75) Inventors: Yoshihisa Beppu, Kanagawa (JP); Shinji Kondoh, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 251 days.

(21) Appl. No.: 10/106,370

(22) Filed: Mar. 27, 2002

(65) Prior Publication Data

US 2002/0183193 A1 Dec. 5, 2002

(30) Foreign Application Priority Data

Mar. 28, 2001 (JP) ........................................ 2001-091962

(51) Int. Cl.[7] .............................................. C04B 14/04
(52) U.S. Cl. ....................... 106/600; 106/601; 106/602; 501/80; 501/85; 501/141; 501/145; 501/146; 501/149; 264/44; 423/333; 423/334; 252/62
(58) Field of Search ............................... 106/600, 602; 501/80, 85, 141, 145, 146, 149; 264/44; 423/333, 334; 252/62

(56) References Cited

U.S. PATENT DOCUMENTS

| | | | | |
|---|---|---|---|---|
| 4,508,841 A | * | 4/1985 | Onuma et al. .................. | 502/73 |
| 5,047,182 A | * | 9/1991 | Sundback et al. ............. | 264/28 |
| 5,082,607 A | * | 1/1992 | Tange et al. .................... | 264/44 |
| 5,240,903 A | | 8/1993 | Shimoyama et al. | |
| 5,397,752 A | * | 3/1995 | Inoue et al. .................... | 501/80 |
| 6,027,796 A | | 2/2000 | Kondoh et al. | |

OTHER PUBLICATIONS

Derwent Publications, XP–002261634, JP 53–109512, Sep. 25, 1978.
Derwent Publications, XP–002251635, Sep. 27, 1988.
Y. Beppu, et al., Ceramic Engineering and Science Proceedings, vol. 22, No. 4, XP–002261630, pp. 145–151, "Fabrication of Highly Porous Silicate Ceramics by Freeze–Drying", Jan. 21–27, 2001.
T. Permien, et al., Clay Minerals, The Mineralogical Society of Great Britain, vol. 29, No. 5, XP–008024666, pp. 751–760, "The Rheological and Colloidal Properties of Bentonite Dispersions in the Presence of Organic Compounds: I. Flow Behaviour of Sodium–Bentonite in Water–Alcohol", Dec. 1994.
T. Fukasawa, et al., Journal of the American Ceramic Society, vol. 84, No. 1, XP–002261631, pp. 230–232, "Synthesis of Porous Ceramics with Complex Pore Structure by Freeze–Dry Processing", Jan. 2001.
M. J. Statham, et al., Journal of Sol–Gel Science and Technology, vol. 19, No. 4, XP–002261632, pp. 553–558, "Net–Shape Manufacture of Low–Cost Ceramic Shapes by Freeze–Gelation", 1998.

* cited by examiner

*Primary Examiner*—Paul Marcantoni
(74) *Attorney, Agent, or Firm*—Oblon, Spivak, McClelland, Maier & Neustadt, P.C.

(57) ABSTRACT

A process for preparing a silicate porous product, which comprises a step of forming a clay mineral into a dispersion by means of a dispersant, a step of removing gases dissolved in the dispersion, a step of freezing the dispersion and drying it in its frozen state under reduced pressure, and a step of firing the dried product obtained by the drying.

11 Claims, No Drawings

PROCESS FOR PREPARING SILICATE POROUS PRODUCT

The present invention relates to a process for preparing a silicate porous product, which comprises degassing a dispersion of a clay mineral to remove gases dissolved in the dispersion, then freezing the dispersion and drying it in its frozen state under reduced pressure, and firing the obtained dried product. More particularly, it relates to a process for preparing a silicate porous product which is useful particularly for a ceramic filter, a heat insulating material, a carrier for catalysts or the like.

A ceramic porous product is excellent in heat resistance and corrosion resistance and thus is used as a filtration filter to be used at a high temperature where an organic material can not be used or under a strongly acidic or alkaline condition, as a heat insulating material or as a carrier for catalysts.

As a material which is actually used for a ceramic porous product, cordierite, alumina or mullite may, for example, be mentioned. Further, one prepared by applying a film of e.g. silica or zeolite to a ceramic porous product made of such a material, has also been reported. The above-mentioned ceramic porous products are formed of oxides, but a porous body of silicon carbide or silicon nitride has also been developed.

As a method for producing a porous product, for example, a method of mixing a foaming or combustible material to a ceramic powder or its slurry, followed by firing, or a method of depositing ceramics to a foam such as urethane itself, followed by firing, is known. Further, JP-A-5-238848 and JP-A-6-24859 disclose a method wherein a slurry is deposited on a synthetic resin foam having a three dimensional network structure, and an excess slurry is removed, followed by drying and firing to form a non-oxide ceramic.

Further, a method for producing a cordierite or alumina honeycomb porous product by means of an extrusion method, is also known and widely used. Further, a porous product produced from fibrous ceramics, is being used as a filter for diesel particulates.

The above-mentioned ceramic porous products have a wide range of applicability in various fields, for example, for physically removing or separating solids from a gas or liquid as filters for filtration or as carriers for catalysts, or for separating and concentrating a desired specific gas from a gas mixture, or as sound-shielding (sound proofing) materials or heat insulating materials.

Further, JP-A-63-230581 discloses a method wherein a mixture of clay and water is rapidly frozen, and ice crystals are permitted to disappear to form a porous product. Further, JP-A-9-132475 discloses a method wherein a material comprising clay, water glass and fiber, is rapidly frozen, then dried and heated to produce a clay composite porous product.

As mentioned above, a ceramic porous product is excellent in heat resistance and corrosion resistance, and thus has excellent characteristics as a filtration filter, a heat insulating material or a carrier for catalysts, which is used at a high temperature where an organic material can not be used or under a strongly acidic or alkaline condition.

Among the above-mentioned ceramic porous products, one to be used mainly as a filter, has a porosity of from 40% to 50% in many cases, but there may be one having a heavy mass. On the other hand, one to be used as a heat insulating material is, in many cases such that fibrous ceramics are used as the raw material, whereby handling is inefficient.

Further, porous products of silicon carbide and silicon nitride, as non-oxides, have disadvantageous such that the raw materials are expensive, the production costs are high, and oxidation resistance at a high temperature is not adequate, and they are used only for limited applications.

Whereas, silicate ceramics represented by clay mineral, are light in weight and relatively inexpensive.

JP-A-63-230581 proposes a method for obtaining a porous product having a very high porosity by rapidly freezing a mixture of clay and water and then letting ice crystals disappear. However, there has been a problem that it is not easy to control the freezing speed while lowering the freezing temperature extremely in order to carry out rapid freezing, and it has been difficult to obtain a thick porous product. Further, JP-A-9-315877 discloses a method for producing a porous product, which comprises heating and concentrating an aqueous dispersion containing clay, followed by freezing and drying. However, there has been a problem that the viscosity of dispersion becomes very high by the concentration, whereby handling and processing of the dispersion are difficult.

Further, JP-A-5-78181, JP-A-8-277174 and JP-A-11-79860 disclose a clay/natural fiber composite porous product, a clay/fumic acid composite porous product and a clay/water-soluble polymer composite porous product, respectively. However, these products contain organic substances and thus have had a problem that they can not be used at a high temperature. Further, JP-A-9-132475 discloses a clay composite porous product comprising clay, water glass and fiber. However, it contains fiber, whereby its use tends to be limited, and it contains water glass, whereby the temperature for its use can not be made sufficiently high.

Here, from the viewpoint of practical use of a ceramic porous product, a porous product having a uniform pore size is easy to use. From such a viewpoint, the above-mentioned JP-A-11-79860 discloses use of a composite sol having air bubbles and a surfactant dispersed in its interior. However, it is difficult in many cases to uniformly disperse air bubbles from the solubility of air bubbles and its temperature dependency. Further, even in a case where a surfactant is used, there is a problem in that its use is limited to a low temperature.

Further, in the use of a ceramic porous product, in addition to control of the pore size, the strength is also an important factor. With a porous product made of a clay mineral as the raw material and not fired, the strength is not sufficient. Further, if pores are not uniformly present, the strength tends to be low.

Further, a clay mineral has a certain degree of heat resistance, but if it is used at a high temperature without firing, heat shrinkage will be remarkable, and due to such shrinkage, it may not be useful as a structural material. Further, as mentioned above, a clay mineral is not easy to form it into a porous product, and it has not been used as a porous product. As mentioned above, it has been desired to develop an inexpensive method while balancing various required properties, a method for producing a ceramic porous product which brings about little environmental pollution, particularly a silicate ceramic porous product using a clay mineral as the starting material and having it fired, and a process for producing it.

Accordingly, the present invention has been made to solve the above problems, and it is an object of the present invention to provide a silicate porous product which is excellent in pore characteristics and strength characteristics and which can be produced inexpensively, and a process for its production.

The present inventors have conducted extensive studies to accomplish the above object and as a result, the present inventors have found it possible to accomplish the above object by presenting a process for preparing a silicate porous product according to the present invention, and the present invention has been accomplished based on such a discovery.

Accordingly, the present invention provides a process for preparing a silicate porous product, which comprises a step of forming a clay mineral into a dispersion by means of a dispersant, a step of removing gases dissolved in the dispersion, a step of freezing the dispersion and drying it in its frozen state under reduced pressure, and a step of firing the dried product obtained by the drying.

The clay mineral to be used in the present invention is one belonging to a clay mineral according to a mineralogical classification, and it preferably is sheet silicate, amorphous silicate or quasi-crystalline silicate, or a mixture thereof. The sheet silicate may, for example, be kaolinite, serpentinite, halloysite, pyrophillite, talc, mica, smectite, chlorite, sepiolite or palygorskite. The amorphous silicate or the quasi-crystalline silicate may, for example, be allophane or imogolite.

In the present invention, the dispersant to be used for forming the clay mineral into a dispersion, is preferably water, or a mixture comprising water and an alcohol.

Further, in the present invention, in the step of removing gases, it is preferred to remove the gases by degassing under reduced pressure or degassing under ultrasonic irradiation, or by employing both.

Further, in the present invention, it is preferred that the frozen and dried dry product (green body) is heated and fired preferably at a temperature of at least 800° C., more preferably from 850° C. to 1,200° C., still more preferably from 1,000° C. to 1,100° C.

Further, the heated and fired silicate porous product preferably has a porosity of at least 90%.

The process for preparing a silicate porous product of the present invention, comprises a step of forming a clay mineral into a dispersion by means of a dispersant, a step of removing gases dissolved in the dispersion, a step of freezing the dispersion and drying it in its frozen state under reduced pressure, and a step of firing the dried product obtained by the drying.

The clay mineral to be used in the present invention is not particularly limited so long as it belongs to a clay mineral according to mineralogical classification, and a natural product or an artificial product may be used. It may, for example, be a sheet silicate such as a kaolinite, serpentinite, halloysite, pyrophillite, talc, mica, smectite, chlorite, sepiolite or palygorskite, or an amorphous silicate or the quasi-crystalline silicate, such as allophane or imogolite. These clay minerals may be used alone or as a mixture of a plurality of them. Further, in the present invention, a clay mineral having a swelling property, or a clay mineral having a relatively large cation exchange capacity, is preferred. Such a clay mineral having a swelling property or a relatively large cation exchange capacity is capable of readily forming a sol. The average particle radius of the clay mineral to be used in the present invention is preferably 2 $\mu$m which is so-called a clay fraction, as converted to spheres. Particles having such a particle size are capable of readily forming a sol. Further, they will substantially settle during the freezing treatment after forming the sol, and thus, they will bring about no change in concentration. If large particles are included, they may be removed by sedimentation treatment after the dispersion treatment, or they may be removed as precipitates at the time of forming the sol.

In the present invention, firstly, the clay mineral is formed into a dispersion by means of a dispersant. In such a case, ultrasonic treatment may be applied for the purpose of e.g. promoting the dispersibility. Further, the content of the clay mineral is preferably from 1 to 20 mass %, based on the dispersion. This content is an important factor governing the porosity, strength, etc., of the resulting silicate porous product. Generally, the lower the content, the higher the porosity of the fired product, and the lower the strength. The content of the clay mineral is preferably from 1 to 20 mass %. However, it may not necessarily be within this range, depending upon the type or the particle size of the clay mineral, or the type of the exchangeable cations. Further, the dispersion is preferably a sol having high dispersibility, whereby the uniformity of the resulting porous product will be high.

Further, in a case where it is difficult to obtain a dispersion by means of water, it is preferred to employ, as a dispersant, a mixture comprising an alcohol and water. In such a case, the clay mineral may be dispersed in the alcohol, and then water may be added. The alcohol to be used in the present invention may be of a type which is commonly used for mixing or pulverizing a usual ceramic powder, such as ethanol or methanol. The concentration of the alcohol in the entire dispersant is not particularly limited. However, such a concentration will influence the structure of a freeze-dried product to be obtained by the subsequent freezing and drying, and over the structure of a fired product obtained by the subsequent heating and firing, and accordingly, it may be set at a predetermined concentration. In the present invention, the concentration is preferably from 10 to 50 vol %. If the alcohol concentration is high, it will be required to lower the temperature in the subsequent freezing step. Further, the alcohol may be evaporated under heating to increase the concentration of the clay mineral. This operation also serves to shorten the drying treatment.

In the present invention, from the formed dispersion, the dissolved gases will be removed. As a method for removing the dissolved gases, degassing under reduced pressure or degassing under ultrasonic irradiation may be mentioned, but degassing under reduced pressure is particularly preferred. Further, both may be carried out simultaneously. The gases dissolved in the dispersion are mainly carbon dioxide, nitrogen and oxygen. So long as it is gases which can be removed under reduced pressure, it may be in a solid state before the pressure is reduced. Degassing under reduced pressure can be carried out in a space where the dispersion is vacuumed by a rotary pump or the like. The reduced pressure is preferably not higher than 1,000 Pa. The temperature under reduced pressure is preferably higher, but is not particularly limited. Further, the vacuuming time depends on e.g. the concentration, the volume and the pressure of the dispersion, but is usually a time until evolution of the dissolved gases will no longer be observed. If removal of the dissolved gases is not sufficient, it tends to be difficult to obtain a freeze-dried product by freezing and drying, or it tends to be difficult to obtain a uniform porous product. Further, the dissolved gases are considered to be present between the clay mineral and interlaminar water. Accordingly, if removal of the dissolved gases is not sufficient, it tends to be difficult to strengthen the bonding of the clay mineral particles by the subsequent drying and firing.

In the present invention, then, the dispersion containing the clay mineral is frozen and dried under reduced pressure in the frozen state. The freezing treatment is preferably carried out quickly after removal of the dissolved gases, whereby redissolution of gases present in air can be prevented. The freezing treatment may be carried out by immersing a mold having a predetermined shape and size, preliminarily filled with the dispersion of the clay mineral, in a cooling medium such as an alcohol, one having dry ice added to an alcohol, or liquid nitrogen, or by putting such a mold in a freezer. The material for the mold governs the cooling speed. To increase the cooling speed, copper, aluminum or the like, which has a high thermal conductivity, may be employed. On the contrary, to slow down the cooling speed, stainless steel, teflon, ceramics such as alumina, or the like, which has a low thermal conductivity, may be employed. Further, the temperature of the cooling medium, i.e. the final freezing temperature and the cooling speed, are not particularly limited. If the cooling speed is slow, crystallization of the dispersant proceeds slowly, whereby the pore size of the resulting porous product tends to be large.

After the freezing, drying is carried out by setting the frozen product in the frozen state in a space and within a chamber vacuumed by means of e.g. a rotary pump. The drying is preferably carried out quickly without delay after completion of the freezing. If the period from the completion of the freezing to the drying, is long, the frozen product is preferably stored at a low temperature. The pressure during the drying may be at a vacuuming degree whereby the frozen product can be maintained without melting. The pressure may vary also depending upon the temperature, but in the case of drying at room temperature, the pressure is preferably at a level of from 1 to 10 Pa.

Further, in the present invention, then, the freeze-dried product of the clay mineral is fired at a temperature of at least 800° C., preferably from 850° C. to 1,200° C., more preferably from 1,000° C. to 1,100° C. This heat treatment is preferably under atmospheric pressure by means of an electric furnace equipped with a heater such as nichrome or silicon carbide. The firing may be applied to the dried product after removing the mold used for freezing and drying. However, in a case where it is not easy to withdraw the dried product from the mold, it may be treated together with the mold. If the firing temperature is lower than 800° C., the strength of the resulting fired product tends to be low, and the handling tends to be difficult. Further, if the temperature is too high, shrinkage will be remarkable, and it tends to be difficult to obtain a fired product without cracks. Usually, under heating at a temperature of at least about 800° C., disappearance of the mineralogical structure of the clay mineral will start, and formation of cristobalite, aluminosilicate, etc. will start. Accordingly, the resulting fired product will contain such silicates in its composition. In the present invention, the temperature raising or lowering speed may suitably be set, but is preferably at a level of from 50° C./hr to 300° C./hr.

Now, the present invention will be described in further detail with reference to Examples. However, it should be understood that the present invention is by no means restricted to such specific Examples.

EXAMPLE 1

Saponite (hereinafter referred to as smectite) belonging to smectite group was dispersed in water to obtain a dispersion. The content of smectite was 2 mass % or 4 mass %. Such a dispersion was stirred for 20 hours and degassed for 60 minutes in a vacuum chamber vacuumed to a level of not higher than 1 kPa, and then it was transferred to a container comprising a bottom made of stainless steel and a side made of teflon, for freezing. Then, the entire container was immersed in ethanol cooled to −80° C. and left to stand for two hours for freezing. Then, the frozen product was transferred as accommodated in the container in the frozen state to a vacuum drier at a temperature of 20° C. under a pressure of 3 Pa and left to stand for 48 hours for drying.

The freeze-dried product prepared as described above, was taken out from the mold and heated and fired at a temperature of from 800° C. to 1,200° C. for 4 hours or 20 hours in an electric furnace equipped with a heater made of silicon carbide. These heating conditions are shown in Table 1.

The porosity of the obtained fired product was measured. The porosity was obtained by dividing the mass of the fired product by the volume obtained from the size and taking the true density to be 2.6 g/cm$^3$. The results are also shown in Table 1.

TABLE 1

| Sample identification | Clay concentration (mass %) | Heat treatment[1] | Porosity (%) |
|---|---|---|---|
| A1 | 2.0 | 800-4 | 99.3 |
| A2 | 4.0 | 800-4 | 98.5 |
| A3 | 4.0 | 900-4 | 98.4 |
| A4 | 2.0 | 1,000-4 | 99.2 |
| A5 | 4.0 | 1,000-4 | 98.4 |
| A6 | 4.0 | 1,000-20 | 99.2 |
| A7 | 4.0 | 1,000-20 | 98.4 |
| A8 | 4.0 | 1,100-4 | 98.0 |
| A9 | 4.0 | 1,200-4 | 95.7 |

[1]The heat treatment shows the temperature (° C.)-time (hr).

From Table 1, it is evident that a silicate porous product is obtained by forming a clay mineral into a dispersion, followed by freezing, drying and then firing.

Comparative Example 1

In the same manner as in Example 1, a dispersion was prepared by means of water so that the content of smectite would be 2 mass % or 4 mass %. Without degassing under reduced pressure, this dispersion was frozen and then dried under a pressure of 3 Pa in the frozen state, in the same manner as in Example 1. With the freeze-dried product obtained from the 2 mass % dispersion, the structure was non-uniform, and many cracks were observed. With the freeze-dried product obtained from the 4 mass % dispersion, the structure was non-uniform, and thin cracks were observed. The products were fired as they were at 1,000° C. for 4 hours, whereby cracks further developed, and it was not possible to obtain large fired products.

Comparative Example 2

In the same manner as in Example 1, a dispersion having a smectite content of 2 mass %, was prepared. This dispersion was degassed under reduced pressure, frozen and dried under a pressure of 3 Pa in the frozen state, in the same manner as in Example 1. The obtained freeze-dried product was fired at 750° C. for 4 hours. The fired product was brittle and susceptible to disintegration when grasped by a hand and did not have adequate strength.

EXAMPLE 2

The same smectite as used in Example 1 was dispersed in a mixture of water and ethanol (1:1 by volume) to obtain a dispersion. The content of smectite was 5 mass % or 7.5 mass %, based on the mixture of water and ethanol. This dispersion was stirred for 20 hours and then left to stand at 70° C. for 4 hours in a vacuum drier to evaporate ethanol. Then, in the same manner as in Example 1, it was frozen and dried under a pressure of 3 Pa in the frozen state. Further, the porosity is shown in Table 2 in the same manner.

TABLE 2

| Sample identification | Clay concentration (mass %) | Heat treatment[1] | Porosity (%) |
|---|---|---|---|
| B1 | 5.0 | 800-4 | 95.3 |
| B2 | 7.0 | 800-4 | 92.5 |
| B3 | 5.0 | 1,000-4 | 94.2 |
| B4 | 7.5 | 1,100-20 | 91.3 |

[1]The heat treatment shows the temperature (° C.)-time (hr).

From Table 2, it is evident that a silicate porous product is obtained in the same manner as in Example 1 by forming a clay mineral into a dispersion, followed by removal of gases, freezing, drying and then firing.

As described in the foregoing, according to the present invention, a process for preparing a silicate porous product, which comprises forming a clay mineral into a dispersion by means of a dispersant, removing gases dissolved in the dispersion, freezing the dispersion and drying it in its frozen state under reduced pressure, and firing the dried product, and the silicate porous product, can be provided. The process of the present invention employs a clay mineral as a raw material, whereby a load to environment is low, and the silicate porous product thereby obtainable, is uniform and has a very high porosity, and thus, it is useful for a filter, a carrier for catalysts, a sound-shielding material or a heat insulating material. The silicate porous product produced by the process for preparing a silicate porous product of the present invention, is thus capable of presenting a filter, a carrier for catalysts, a sound-shielding material or a heat insulating material excellent in pore characteristics and strength characteristics.

The entire disclosure of Japanese Patent Application No. 2001-91962 filed on Mar. 28, 2001 including specification, claims and summary are incorporated herein by reference in its entirety.

What is claimed is:

1. A process for preparing a silicate porous product, which comprises a step of forming a clay mineral into a dispersion by means of a dispersant, a step of removing gases dissolved in the dispersion, a step of freezing the dispersion and drying it in its frozen state under reduced pressure, and a step of firing the dried product obtained by the drying.

2. The process for preparing a silicate porous product according to claim 1, wherein the clay mineral is sheet silicate, amorphous silicate or quasi-crystalline silicate, or a mixture thereof.

3. The process for preparing a silicate porous product according to claim 1, wherein the clay mineral is dispersed in an amount of from 1 to 20 mass % in the dispersion.

4. The process for preparing a silicate porous product according to claim 1, wherein the dispersant is a mixture comprising water and an alcohol.

5. The process for preparing a silicate porous product according to claim 4, wherein the content of the alcohol is from 10 to 50 vol %.

6. The process for preparing a silicate porous product according to claim 1, wherein the reduced pressure is not more than 1,000 Pa.

7. The process for preparing a silicate porous product according to claim 1, wherein in the step of removing gases, the gases are removed by degassing under reduced pressure or degassing under ultrasonic irradiation, or by employing both.

8. The process for preparing a silicate porous product according to claim 1, wherein in the firing step, heating is carried out at a temperature of at least 800° C.

9. The process for preparing a silicate porous product according to claim 1, wherein in the firing step, heating is carried out at a temperature of from 850° C. to 1,200° C.

10. The process for preparing a silicate porous product according to claim 1, wherein in the firing step, heating is carried out at a temperature of from 1,000° C. to 1,100° C.

11. The process for preparing a silicate porous product according to claim 1, wherein the silicate porous product has a porosity of at least 90%.

* * * * *